(12) United States Patent
Cooper et al.

(10) Patent No.: US 11,015,999 B2
(45) Date of Patent: May 25, 2021

(54) DETERMINING AIR LEAKAGE (71) Applicant: The University of Nottingham, Nottingham (GB)

(72) Inventors: Edward Cooper, Nottingham (GB); David Etheridge, Nottingham (GB); Yingqing Zu, Nottingham (GB)

(*) Notice: Subject to any disclaimer, the term of this patent is extended or adjusted under 35 U.S.C. 154(b) by 594 days.

(21) Appl. No.: 15/391,538

(22) Filed: Dec. 27, 2016

(65) Prior Publication Data

US 2017/0122834 A1 May 4, 2017

Related U.S. Application Data (63) Continuation of application No. PCT/GB2015/051901, filed on Jun. 29, 2015.

(30) Foreign Application Priority Data

Jun. 27, 2014 (GB) ..................... 1411500

(51) Int. Cl.
*G01M 3/26* (2006.01)
*G01M 3/32* (2006.01)

(52) U.S. Cl.
CPC ............. *G01M 3/26* (2013.01); *G01M 3/32* (2013.01); *G01M 3/3236* (2013.01)

(58) Field of Classification Search
CPC ......... G01M 3/26; G01M 3/32; G01M 3/3236
See application file for complete search history.

(56) References Cited

U.S. PATENT DOCUMENTS

| 4,510,791 A | 4/1985 | Yuill |
| 5,331,826 A * | 7/1994 | Stockhaus ............... A63C 19/10 62/235 |
| 2008/0000542 A1* | 1/2008 | Cohen ..................... F17C 5/007 141/18 |

(Continued)

OTHER PUBLICATIONS

Cooper E.W. et al.: "Determining the adventitious leakage of buildings at low pressure. Part 2: Pulse technique", Building Services Engineering Research and Technology, Chartered Institution of of Building Services, London, GB, vol. 28, No. 1, Feb. 1, 2007, pp. 81-96 (Year: 2007).*

(Continued)

*Primary Examiner* — Michael J Dalbo
(74) *Attorney, Agent, or Firm* — Burke, Williams & Sorensen, LLP; Robert W. Dickerson (57) ABSTRACT

A system (100) and method for determining the air leakage of a space (102) in a building is disclosed. The system (100) comprises a processor (120); a source (130) of compressed air; a pressure sensor (150) configured to measure the pressure of air residing within the space (130) and to provide background pressure signals to the processor (120); a nozzle unit (140) for metering the supply of a pulse of compressed air from the source (130) and for directing the pulse into the space (102) and a source pressure sensor (132) configured to measure a transient pressure during the pulse and to provide a transient pressure signal to the processor (120), wherein the processor (120) is configured to determine the air leakage based on changes in the background pressure signals and from the transient pressure signal. This provides a more reliable and cost effective way of measuring air leakage.

24 Claims, 7 Drawing Sheets

(56) References Cited

U.S. PATENT DOCUMENTS

2008/0213723 A1* 9/2008 Tanaka ............... A61C 1/05 433/132
2013/0047706 A1 2/2013 Kim et al.
2015/0323411 A1* 11/2015 Eberlein ............ G01M 3/3263 73/40

OTHER PUBLICATIONS

Bae Sungryong et al.: "Improvement in the applicability of the air tightness measurement of the air tightness neasurement using a sudden expansion of compressed air", Building and Environment, Pergamon Press, Dxford, GB, vol. 61, Jan. 5, 2013, pp. 133-139 (Year: 2013).*

Cooper E.W. et al.: "Determining the adventitious leakage of buildings at low pressure. Part 2: Pulse technique", Building Services Engineering Research and Technology, Chartered Institution of Building Services, London, GB, vol. 28, No. 1, Feb. 1, 2007, pp. 81-96, XP008177416, ISSN: 0143-6244, DOI: 10.1177/0143624406072331.

International Search Report and Written Opinion dated Oct. 10, 2015 of corresponding PCT application No. PCT/GB2015/051901.

Bae Sungryong et al.: "Improvement in the applicability of the air tightness measurement of the air tightness measurement using a sudden expansion of compressed air", Building and Environment, Pergamon Press, Oxford, GB, vol. 61, Jan. 5, 2013, pp. 133-139, XP028979530, ISSN: 0360-01323, DOI: 10.1016/J. Buidnev.2012.12.017.

Cooper E: "Determining the adventitious leakage of buildings at low pressure. Part 1: Uncertainties" Building Services Engineering Research and Technology, Chartered Institution of Building Services, London, GB, vol. 28, No. 1, Feb. 1, 2007, pp. 71-80, XP008177414, ISSN: 0143-6244, DOI: 10.1177/0143624406072330.

* cited by examiner

DETERMINING AIR LEAKAGE

FIELD

Improvements in and relating to determining air leakage are described. More particularly, a system and method for determining the air leakage of a space in a building are disclosed.

BACKGROUND

Air tightness is essential to building energy performance, which has been acknowledged for a long time. It plays a significant role in improving building energy efficiency by minimising the heating/cooling loss incurred during unwanted air movement through the building envelope, consequently reducing the building's energy demand and cutting down the carbon emission in buildings sector.

In European Directive 2010/31/EU on the energy performance of buildings, it is stated that the energy efficiency of buildings has to be calculated in the member states. Air leakage of a building envelope has a significant effect on the building's energy efficiency and making a building substantially air tight can make a considerable reduction in energy consumption and hence CO2 production. In the UK, the adventitious leakage of buildings has received particular attention and a standard has been set in the form of a maximum value for the air permeability at a pressure of 50 Pa ($Q_{50}$) in Building Regulations. The adoption of 50 Pa is a compromise, because leakage measurements at lower pressures are perceived to be subject to large errors arising from pressures generated by wind and buoyancy during the test. However, natural ventilation pressures are typically at an order of magnitude <50 Pa and therefore $Q_{50}$ is not an ideal indicator of the infiltration potential of an envelope. In fact, a pressure difference of 4 Pa is commonly taken to be typical of natural ventilation and, ideally, the leakage at 4 Pa ($Q_4$) would be determined.

In order to test the leakage at 4 Pa directly, some investigations have been done on the basis of a pulse pressurisation technique. In early tests, a simple gravity-driven piston device has been used to generate a pulse. A more practical version was devised in which the piston was driven by a supply of compressed air. In recent developments, a quasi-steady piston pulse technique has been developed that demonstrated that direct measurement of $Q_4$ could give a much more accurate measure of the infiltration potential of an envelope than the current high-pressure technique. The former could reduce the uncertainty by a factor of three or more.

Previous research carried out in measuring air tightness of buildings or ventilation systems can be classified into two categories, steady technique and unsteady technique, according to the way in which they approach the measurement. Steady technique does it by establishing a steady state pressure difference across the envelope and recording the correlation between the established pressure difference and corresponding flow rate. "Blower door" is the most commonly used steady technique for measuring the building air tightness in construction industry. It uses a door fan to take the air in or out of the building to create a range of pressure difference (usually between 10 Pa-60 Pa) across the building envelope and the corresponding airflow rate of the fan is recorded. This technique was firstly used in Sweden around 1977. However, uncertainties inherent in fan pressurization techniques introduce difficulties in measurements of airflow and pressure. Model specification errors may also contribute to the overall uncertainty in the estimates of 4 Pa leakage. An analysis and comparison of the uncertainties in $Q_{50}$ measurement and $Q_4$ measurement suggest that direct measurement of $Q_4$ can reduce the uncertainty by a factor of three or more.

According to the recent UK standards, the pressurisation at 50 Pa has been widely recognised as the method for measuring the air permeability. It is selected at such a level because it is much higher than the level of pressure change caused by the wind and buoyancy effect so as to be able to neglect the errors caused by wind and buoyancy effects in the test. However, this method is a compromise due to the following deficiencies:

The pressures it exerts on the building envelope are significantly higher than those experienced under natural conditions, which is typically around 4 Pa. Therefore, it requires extrapolation from the measurement at high pressure level to calculate the leakage under natural condition. This adds uncertainty into the accuracy. The hydraulic characteristic of the opening is also changed by the testing pressure level which is much higher than the level given under natural conditions. It cannot make real-time leakage area measurements as the pressure and temperature vary with the weather condition, making the reading unstable and determination of the value unsure.

The large volumes of air displaced by the fan can cause inconveniences such as large indoor temperature changes, which deviates from the thermal conditions in reality. The installation of a blower door necessary for the test requires the removal or reposition of the window or door in the external opening where the blower door devices are installed and this changes the air leakage characteristic of the opening where the blower door is installed. One set of tests can only obtain a single point result which is then used to predict the leakage under natural conditions using empirical values of C and n in a power law equation, which cause non-negligible error to the prediction due to inaccuracy at low pressure. Multiple points test would give better accuracy than the single point test as it acquires the characteristic curve of the building air tightness (usually at an increment or decrement of 10 Pascal in the range of 10-60 Pa). However, such multiple tests take a longer time to conduct and still needs to use the power law equation to extrapolate the leakage under natural conditions.

Such a high level of pressure differences presents a risk of damaging the building structure or the fabric of the dwelling. The non-uniform pressure distribution cannot be avoided when large fan is used to pressurise buildings with large volume.

These deficiencies stand out more obviously when the measured buildings are in large scale because the required fan flow rate increases more or less in direct proportion to the volume of the building. The problem can be reduced by relaxing the requirement for 50 Pa down to 25 Pa or even lower, but another issue arises. The lower the pressure becomes, the less accurate the measurement is, due to being close to the pressure generated by buoyancy and wind. In order to control the error caused by this procedure within an acceptable range, the ASTM standard requirement (E779-03) recommends to only conduct the test when the product of the absolute value of indoor/outdoor air temperature difference multiplied by the building height, gives a result less than 200 m° C. Hence, a preferable outside temperature, which is from 5° C. to 35° C., is recommended in the standard to avoid any significant error caused by fan pressurisation. This also applies to the wind speed, which is under 2 m/s preferably. This limits the weather conditions when the testing can be performed.

The unsteady technique, known as dynamic air tightness measurement technique, analyses the pressure-flow correlation when the building envelope is exposed to varying pressure. With unsteady techniques, the required information is determined indirectly by measuring the pressure response to a known disturbance. With this technique, it is able to accurately generate a known volume change to the building enclosure which makes the sources of error introduced by this technique less than the steady technique.

One part of unsteady techniques is to pressurise the building enclosure or cavity to the desired pressure level by supplying air or extracting air in some occasion. Then the pressure is varied by devices like a piston or left to decay naturally. During the pressure decay over a certain period of time, the relation between the air leakage rate and pressure difference across the building envelope is recorded. According to the pressurisation style, the unsteady technique includes three types, which are AC pressurisation, gradual pressurisation and pulse pressurisation, respectively. The present disclosure focuses on the pulse pressurisation method and aims to improve such techniques to alleviate such disadvantages currently inherent in such techniques.

SUMMARY

According to a first aspect of the present invention there is provided a processor; a source of compressed air; a pressure sensor configured to measure the pressure of air residing within the space and to provide background pressure signals to the processor; a nozzle unit for metering the supply of a pulse of compressed air from the source and for directing the pulse into the space; and a source pressure sensor configured to measure a transient pressure during the pulse and to provide a transient pressure signal to the processor, wherein the processor is configured to determine the air leakage based on changes in the background pressure signals and from the transient pressure signal.

The system acts to provide a volume of compressed air into a space to determine the air leakage of the space. The nozzle unit is configured to meter a volume of compressed air to generate a pulse. From a quasi-steady state of the pulse, low-pressure leakage of the building can be measured directly. By taking account of pressure signals indicative of pressure variations of the background before and after the pulse, together with a transient pressure signal indicative of the transient pressure of the pulse, the processor determines a mass flow rate from the nozzle, during the quasi steady period and determines a volume flow rate from the nozzle unit.

In embodiments, the source can be a pressure tank containing compressed air. This allows the system to be portable. The system may be mounted, for example, on a wheeled trolley. The pressure tank may be made from a composite material. A typical capacity of the tank is 50l to 100l. More particular, capacity of the tank is 80l. The minimum size of the tank is determined by the need to generate a quasi-steady pulse during the latter stages of the pulse. If the capacity of the tank is too small, then pressure drop during the pulse is too large to maintain. Conversely, if the capacity of the tank is too large, the portability of the system is affected.

An example of the pressure used for the source, for example for the pressure tank, is 10 bar. The use of pressures substantially lower than this may fail to produce a pulse with sufficient quasi steady flow, whilst pressures substantially higher than this may fail to produce even pulses.

The source pressure sensor may be configured to measure a transient pressure during the pulse by measuring the pressure within the source or within the nozzle unit. The pressure may be directly measured as the pulse is applied to the air residing within the area of detection of the source pressure sensor, or it can be measured partially indirectly by measuring the drop in pressure of the source of compressed air. For example, by providing the source pressure sensor within the source of compressed air, such as a compressor unit, the drop in pressure of the source can be monitored.

The system may further comprise a reference pressure source for providing a reference pressure reading. The use of a reference pressure source allows for the adjustment of external effects, such as wind and buoyancy by providing a reference pressure for the system. The reference pressure source may be an external space, separate from the building containing the space to be tested for air leakage. In an alternative example, the reference pressure source can be a reference pressure tank having a known volume and pressure of air. Use of a reference pressure tank allows the reference pressure source to be placed within the building, removing external effects such as wind and buoyancy. Measurement of the reference pressure may be provided by a reference pressure sensor for generating a transient reference pressure signal of the reference pressure source.

In embodiments, the nozzle unit may comprise an outlet for delivering the pulse into the space and a valve connection between the outlet and the pressure tank. The nozzle unit acts to meter the delivery of the pulse into the space. Preferably, the unit is designed to gradually reduce the constriction of flow of the pulse as it leaves the tank. In embodiments, the outlet is a pneumatic silencer for controlling expansion of the pulse of compressed air into the space. As well as quieting the operation of the system as the pulse is provided to the space, the use of a pneumatic silencer acts as a diffuser. The use of a diffuser reduces any issues arising from entrainment and also improves the reliability of the nozzle unit. More generally, the nozzle unit is configured to produce a reproducible pulse shape.

In examples, the valve connection is a solenoid valve. The valve connection may also or alternatively be an automated valve. Additional valve fittings, such as a tank fitting for providing an initial flow constriction, a manual ball valve to isolate the source of compressed air from the nozzle unit during transportation of the system and various adapters may also be provided. The dimension of such components is generally chosen to provide the best quality pulse shape. Typical dimensions of the components provide a range of diameters, with between 0.5 inches and 1 inch being particularly favourable. The outlet may have a 1 inch diameter at its external edge.

The components of the nozzle unit will provide flow constriction of the pulse as it passes from the source into the space. If there is too little flow constriction, the volume flow rate of the pulse is initially too large and the pressure drop during the pulse is too great to achieve quasi steady conditions. Conversely, if the flow constriction is too high, the shape of the pulse may be acceptable, but the magnitude is too low to provide reliable results for spaces found in most buildings.

The nozzle unit is generally operated to open for a period of time required to provide a desired volume of the pulse. The pulse metered by the nozzle unit may generally have a volume more than 0.003% and less than 0.5% of the volume of the space.

In embodiments, the nozzle unit may supply a pulse of 1.5 s duration starting at 10 bar pressure. This is achieved, by opening the valve components between the space and the source to allow pressurised air to enter the space (which generates the pulse).

As noted above, the nozzle unit may be configured to gradually reduce the flow constriction of the pulse from the source to the space. The source pressure sensor may be configured to record a series of transient pressures and supply a series of transient pressure signals to the processor to determine a mass flow of air out of the source during supply of the pulse.

Embodiments, the system may further comprise a compressor for providing and/or maintaining the source of compressed air. As noted above, the compressor may provide the pressure tank for the supply of compressed air. Alternatively, the compressor may be provided separately to pressurise the pressure tank.

In examples, the system may further comprise a control unit for controlling the metering of the supply of the pulse from the source. The control unit may be configured to communicate with the processor to control the nozzle unit and the pressure sensors based on the pressure signals received by the processor.

According to $2^{nd}$ aspect of the present disclosure there is provided a control unit for determining the air leakage of a space in a building, said control unit comprising one or more systems according to the $1^{st}$ aspect and configured to control the metering of the supply of the pulse from the source.

In examples, the control unit may integrate one or more components of the system within the control unit. This improves portability of the system.

According to a $3^{rd}$ aspect of the present invention there is provided a method of determining the air leakage of a space, said method comprising the steps of: measuring a background pressure of air residing within the space; displacing a volume of compressed air from a source into the space using a nozzle unit to direct a pulse of pressurised air; determining an injection pressure of the pulse as it is directed into the space; measuring an altered background pressure of air residing within the space after dissipation of the pulse; determining a background pressure variation based on the background pressure and the altered background pressure; determining a mass flow rate of the pulse of pressurised air from nozzle unit using the injection pressure, the volume of compressed air, the background pressure variation and the volume flow rate; and determining a leakage profile of the air filled space based on the mass flow rate.

In examples, the step of determining an injection pressure may further comprise the step of: obtaining the change in internal pressure of the space during at least a portion of the pulse. The polynomial curve fit may be used to determine the equivalent still air internal pressure during the period to determine whether a quasi-steady flow has been achieved for the pulse.

In such examples, the step of determining a background pressure variation may further comprise the step of: interpolating a transient background pressure of air during the pulse of pressurised air from the background pressure of air and the altered background pressure of air. Generally, the background pressure cannot be measured during application of the pulse to the space. Accordingly, analysis of the before and after background pressures may allow interpolation for the equivalent transient background pressure of the air during the pulse period. This curve can then be subtracted from the internal pressure to provide an indication of the pulse in still-air conditions and to minimise the effect of external wind buffeting and buoyancy against the building. The buoyancy in the context of the present disclosure refers to pressure differences resulting from temperature differences in and out of the building, i.e. pressure effects that are not driven by the wind. The impact of the variations in the buoyancy is typically more relevant within spaces in buildings.

In such examples, the step of determining a leakage profile may further comprises the step of adjusting for the transient background pressure as noted above.

In embodiments, the method may further comprise the step of extrapolating the leakage profile to determine the likely leakage of air leakage from the space at elevated air pressures. This may be important in providing a comparison between existing techniques used for measurement of leakage, which typically rely on over pressuring the space to be tested, and the present technique described in the methods above.

In this disclosure, a nozzle pulse pressurisation technique is explored, using a compressor nozzle to generate a pulse, so as to make the test rig more compact and portable. Unlike previous techniques, which obtain the mass flow rate on the basis of the velocity of a moving component, the present technique can obtain the mass flow rate from the nozzle unit more directly and accurately.

As noted above, in embodiments, the techniques generate the pulse using a compressor and nozzle, so as to make the test rig compact and portable. The present nozzle pulse technique can minimize the effects of wind and buoyancy force and can provide very repeatable results that are sensitive to small changes in leakage.

In a comparison between the nozzle test and piston test it can be shown that that the nozzle technique is typically more reliable, as some uncertainties in determining the volume flow rate can be avoided. In a power law fitting, a good agreement with the steady state test has been shown by the experimental results obtained in a test using the nozzle pulse technique. The mathematical representations for these two different techniques, that approach the measurement of building air tightness in different ways, are further discussed and experimentally verified below.

Broadly, the pressure pulses are repeated for, for example, five tests. The obtained curves of pressure pulses may then be adjusted to take account of any variation of background pressure due to wind during the pulse period. This may be performed by fitting a curve to the data before and after the pulse, and then subtracting the curve from the raw data.

As noted above, the present disclosure identifies a novel nozzle pulse pressurisation technique for determining the adventitious leakage of buildings at low pressure around 4 Pa, which is regarded as a more accurate indicator than conventional steady state measurement at 50 Pa. This technique is investigated theoretically, numerically and experimentally. The disclosure is based on a 'quasi-steady pulse' concept which produces a pressure pulse inside the building by introducing a certain amount of air in a very short time using, for example, an air compressor, solenoid valve, nozzle and control unit. A mass flow rate from the nozzle may be obtained by measuring the transient pressure in the air receiver of the compressor during a test. Simultaneously, the pressure difference across the building envelope may be measured by a differential pressure transducer. A quadratic equation, which can more closely represent the flow characteristics of adventitious openings, may be used to determine the characteristic of building air leakage. Due to short time operation, the technique can minimize the effects of wind and buoyancy force and has proven to be highly repeatable. A comparison with previous techniques suggests that the present disclosure may be reliable for determining building leakage at low pressure. The present techniques may also give increased convenience in practical applications due to being allowing a more compact and portable system than existing systems. Moreover, only a few seconds are typically required for a test run. Additionally, the system barely needs to penetrate the building envelope and therefore can establish the leakage of a building very quickly and efficiently.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
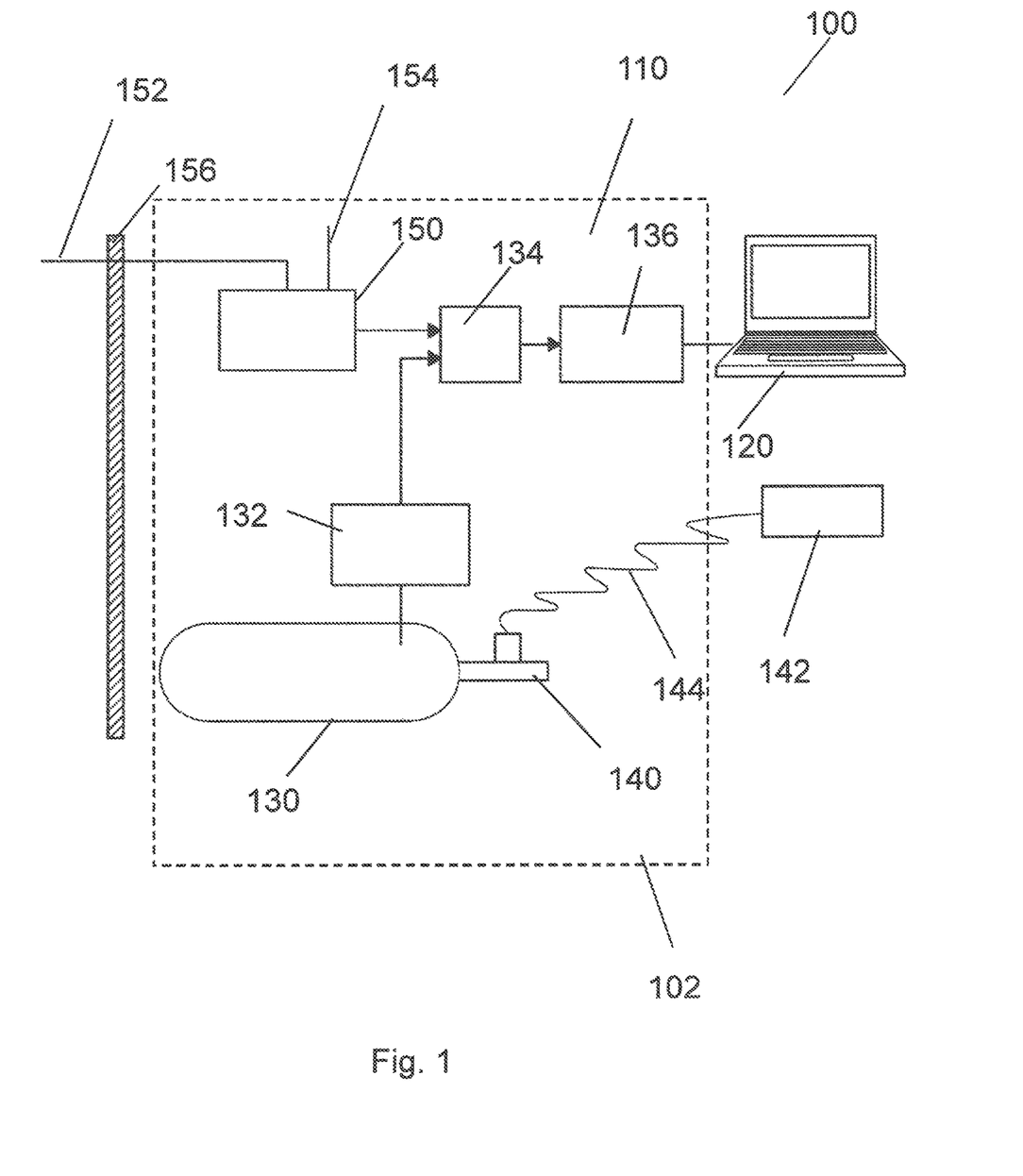
FIG. 1 illustrates an example system including a source, pressure sensors and a nozzle unit for determining leakage of a space according to aspects of the present disclosure.

FIG. 1 shows a schematic overview of a system 100 for determining the air leakage of a space 102 in a building. The system 100 broadly comprises a nozzle pulse generation unit 110 and a processor embodied as a computer 120 in FIG. 1. The unit 110 comprises of a source 130, in the example shown being a compressed compressor with a volume of 80 L and a maximum pressure of 10 bar. It can be appreciated that other sources of compressed air may be utilised.

The compressor or source 130 has a pressure sensor, such as a pressure transducer 132 that is configured to measure the pressure of the compressor at regular intervals, and particularly during the metered release of gas from the compressor 130 as will be described below. In the example shown, the pressure sensor 132 is a strain-based pressure transducer having a 0-16 bar range that is used to measure the instantaneous pressure in the compressor receiver over a period of time.

The pressure sensor 132 is configured to provide pressure signals to the computer 120 via a connection box 134 and an analog to digital convertor 136. A nozzle unit 140 is connected to the compressor 130 and acts to meter the release of a specific volume of air or gas from the compressor 130 in response to a command from a control unit or controller 142, which may be integrated into the computer 120. The pressure sensor 132 may instead or additionally be provided in the nozzle unit 140.

As will be described in greater detail below, the nozzle unit 140 has an electrically controlled valve controlled by the controller 142 via a cable connection or wireless communication connection 144.

One or more additional background pressure sensors 150, such as a differential pressure transducer having a 20 Pa range (although other pressure sensors having alternative ranges may be used), is connected to external 152 and internal 154 tappings with different locations on either side of an external wall 156. This allows pressure readings to be taken of the background pressure of air within the space using the internal tapping 154 and a reading of a reference external pressure source using the external tapping 156. It can be appreciated that separate pressure sensors may be used.

In order to record data from transducers at a high sampling rate, with a high resolution and in such a way as to produce quick manipulation, an Analog to Digital converter card 136 inserted in a laptop 120 was used. The card 136 is connected with a Bayonet Neill-Concelman (BNC) terminal box 134 in order to provide easy connection with the transducers 132, 150. Records of pressure signals containing data from the different pressure sensors 132, 150 are taken at a frequency of 200 Hz and can be stored on the computer 120. Different sampling rates may be used depending upon the data accuracy required. A sampling rate of 20 Hz or more is typically sufficient. It may also be appreciated that whilst described as separate components, one or more of the above described components may be integrated into a single chip or controller. For example, the card 136, terminal box 134 and one or more of the pressure sensors 132, 150 may be combined with the control box 142 and/or the computer 120.

Figure 2:
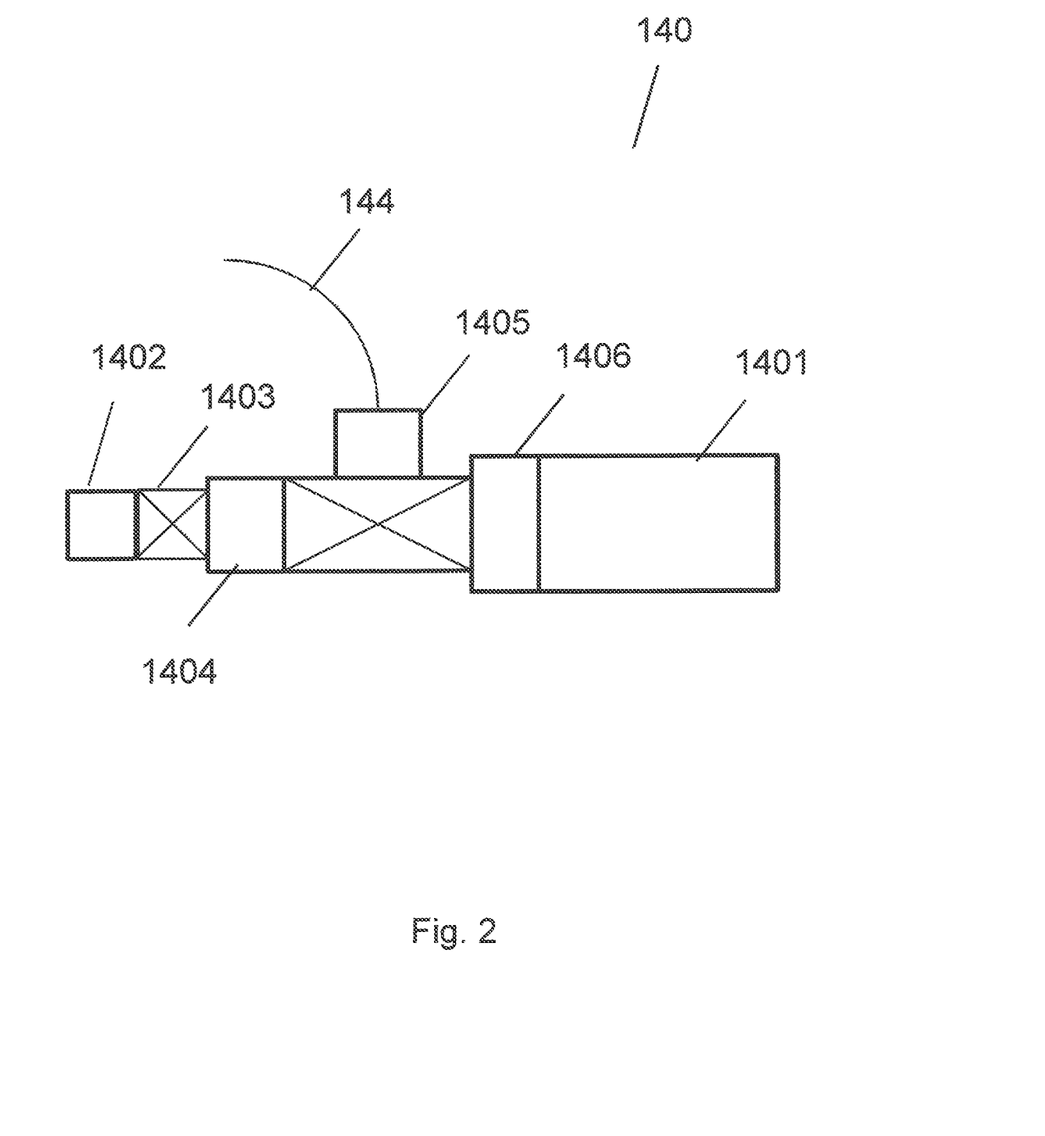
FIG. 2 illustrates a schematic of the nozzle unit of FIG. 1.

FIG. 2 shows an example of the nozzle unit 140 shown in FIG. 1. The nozzle unit comprises a number of valves and other flow components for controlling the metering of flow from the source of compressed air (typically a compressor) into the space using the nozzle unit. The nozzle unit comprises a pneumatic silencer 1401 that acts as a diffuser to reduce entrainment of the air released from the source 130 and improves the reliability. The silencer 1401 has a 2.54 cm (1 inch) diameter outlet. A 1.27 cm diameter tank fitting 1402 connects the nozzle unit 140 to the source 130. This also provides some initial flow constriction to air released from the source 130. A manual ball valve 1403 may be used to isolate the nozzle unit 140 from the source, such as during transport. An adaptor 1404 couples the manual ball valve 1403 to a 1.905 cm bore diameter solenoid valve 1405 that is operated via a cable 144 by the electronic controller 146 for the desired time to provide and meter supply of compressed air from the source 130 into the space 102. A final adaptor 1406 connects the solenoid valve 1405 to the diffuser 1401.

The nozzle unit 140 is specifically designed to gradually reduce the constriction of flow of air from the source 130 as it leaves the source 130. The specific components listed have been chosen to produce a best quality pulse shape of air provided by the source 130 as the valve 1405 is opened. The above stated dimensions of the nozzle unit 140 components are intended as guide measurements. For the present system, different sizes and combinations have been investigated, but any deviation from these specifications tended to result in a poorer quality quasi-steady period of the generated pulse of air. Specifically, if there is too little flow constriction the volume flow rate is initially too large and the pressure drop during the pulse is too great for quasi-steady conditions to be reached. Conversely, if the flow constriction is too much, then the shape of the pulse may still be acceptable, but the magnitude will be too small to give reliable results in most buildings. However, such variations may be desirable for some applications.

In use, in response to a test request, the system 100 undertakes the following steps: Firstly, the background internal pressure fluctuations in the test building are recorded by the pressure sensor 150 for two seconds and a signal sent to the processor 120 identifying the pressure. The solenoid valve 1405 is opened for 1.5 seconds, allowing a flowrate from the tank 130 into the test building space 102 and thereby generating a low pressure pulse in the internal pressure of the space 102.

After the valve 1405 has shut and the pulse equalised, the background internal pressure is again recorded for two seconds using the pressure sensor 150 and a signal is sent to the processor 120 identifying the pressure.

It may be appreciated that multiple systems 100 may be provided to test a single space 102 or multiple spaces within a building. The use of multiple systems 100 may be provided to test a single space 102 or multiple spaces 102 within a building. The use of multiple units working simultaneously ensures uniform pressure distribution for large and/or leaky buildings. If multiple systems 100 are used, said system may be controlled by the control unit 142 and/or the processor 120.

The analysis of the test is then carried out, namely using the following stages:
a) Adjustment for wind and buoyancy effects: A 6th order polynomial (using partial pivoting with Gaussian elimination) is fitted to the background internal pressure readings obtained by the pressure sensor 150 before and after the pulse, thereby interpolating for predicted background pressure during the pulse period, when the background pressure cannot be measured. This curve is then subtracted from the internal pressure reading during the pulse period in order to determine the pulse in still-air conditions and minimise the effects of wind and buoyancy.
b) Obtaining the change in internal pressure with time: A polynomial curve fit is made to the still-air internal pressure during the period where quasi-steady flow has been developed to provide the transient pressure.
c) Obtaining the volume flow rate from the nozzle unit 140: A polynomial curve is fitted to the raw pressure data from the compressed air tank 130 during the quasi-steady period. Then using a nozzle model, the transient mass flow rate from the nozzle unit 140 is obtained, from which, by assuming the internal density of the air is uniform, the volume flow rate from the nozzle unit 140 can be found.
d) Determining the leakage of the space 102 within the building: With both the transient internal pressure and volume flow rate from the nozzle unit 140 determined, the transient leakage of the space 102 within the building can be determined by making an adjustment for the change of internal pressure (i.e. compressibility of the air) using a form of the continuity equation from a quasi-steady temporal inertia model The low pressure pulse system 100 and associated technique described above generates an instant pressure rise in the space 102 tested within the building enclosure, followed by a period of quasi-steady pressure change before the valve is closed, after which the pressure pulse is left to decay naturally. The quasi-steady period is monitored using the pressure sensor 150 and used to determine the building air tightness of the space 102. Compared to existing techniques, the present system is a less complex and can be deployed as a portable device that can be used to generate a pressure increase by adding a known volume of air to the space 102. A volume change of the space 102 at the order of 0.004% of the total volume of the space 102 is sufficient to allow a result of air tightness. Such volumes can generate a pulse pressure in the order of 4 Pa.

The pulse generation is achieved by opening the solenoid valve 1405 for a short period. The pressure difference across the space and the pressure inside the compressor tank 130 are measured by differential pressure transducer 150 and pressure transducer 132, respectively. It has been shown previously that the pulse pressurisation technique creates a period of quasi-steady flow, which can be used to determine the leakage of a building. To determine the leakage the volume flow rate of released air from the compressor tank 130 and pressure difference across the pulse is obtained. The latter can be measured directly, but the former requires the use of a theoretical model for the nozzle technique. The air leakage rate is determined by using the gas law which correlates the time derivative of the pressure difference to a change in mass per unit time.

Mathematically, the building leakage under quasi-steady pulse pressurisation conditions can be described by a quasi-steady/temporal inertia model (QT model). The QT model solves a set of simultaneous first order differential equations, namely the continuity equation for the enclosed space and an integral momentum equation for each opening. The continuity equation includes the effect of compressibility of the air in the space and takes the form:

$$\frac{1}{\rho_i} V \frac{d\rho_i}{dt} = Q_p\{t\} - q\{t\} \tag{1}$$

where V and $\rho_i$ are the volume and internal density of the space 102 within a building, $Q_p$ is the pulse volume flow rate (volume flow rate from pulse pressurisation device under the internal pressure of building) and q is the volume flow rate through openings of building. Isentropic expansion of the air is assumed to provide the relation between density $\rho_i$ and internal pressure $p_i$ as $p_i/\rho_i^\gamma = C$, where C is a constant and $\gamma=1.4$ is the specific heat ratio. Therefore, $$q\{t\} = Q_p\{t\} - \frac{V}{\gamma \rho_i} \frac{d\rho_i}{dt}. \tag{2}$$

For quasi-steady flow the leakage of the building $q\{t\}$ can be obtained from Eq. (2) by knowing the pulse volume flow rate, $Q_p\{t\}$. Therefore, the key technique is to measure $Q_p\{t\}$. Assuming that the internal density of air is uniform and invariable, $Q_p\{t\}$ can be given by:

$$Q_p\{t\} = \dot{m}_p(t)/\rho_i, \tag{3}$$

where $\dot{m}_p(t)$ is the mass flow rate from the nozzle unit 140. Based on isentropic expansion in the space, the transient pressure and density of the air is constant over time (i.e. C as noted above is the same). Therefore:

$$P(t)/P_0 = [\rho(t)/\rho_0]^\gamma \tag{4}$$

where $P(t)$ and $\rho(t)$ are the transient pressure and density of the air in the receiver. The mass of the air in the compressor at time t can be given by, $$m_p(t) = \rho(t) V' \quad (5)$$

where $V'$ is the volume of the air receiver. The transient mass flow rate is therefore, $$\dot{m}_p(t) = \frac{\rho_0 V'}{\gamma P_0} \left[\frac{P(t)}{P_0}\right]^{\frac{1-\gamma}{\gamma}} \dot{P}(t) \quad (6)$$

where $\rho_0$ can be determined from the initial temperature, $T_0$ and the gas constant, R.

Computation fluid dynamics (CFD) simulations (based on a finite volume method) have been used to numerically validate the model, specifically the following items:
1. The air pressure in the compressor tank is uniform.
2. The mass flow rate of released air via the nozzle unit is calculated.
3. The air density in the space (the building envelope) is uniform and constant.

Figure 3:
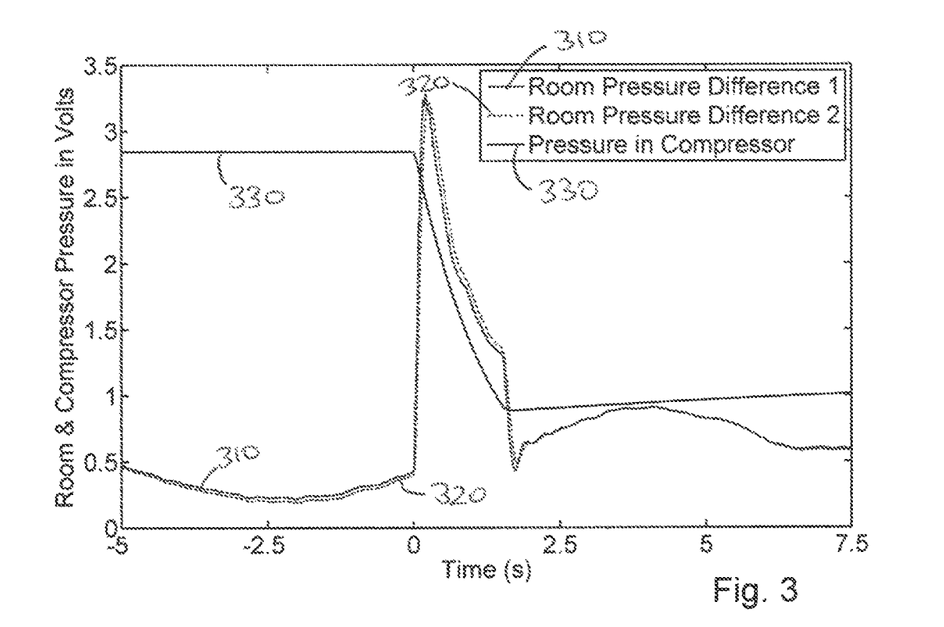
FIG. 3 is graphical data recorded by the pressure sensors of FIG. 1.

For experimental validation, the building used for measurement had a regular cuboid shape with a length, width and height of 9.20 m, 6.04 m and 2.45 m, respectively. For every test run, the compressor 130 was charged to the maximum value of pressure (approx. 10 bar); and the room temperature during the test was $T_0$=292 K. FIG. 3 shows a comparison of how the room and compressor pressure as measured by the pressure sensors 132, 150, varied over time for two test runs 310, 320. In this case, the raw data obtained by the measurement devices 132, 150 consists of the pressure difference in voltage across the building walls 310, 320 and the pressure in voltage of the air receiver of the compressor 330 against time t.

It can be seen from FIG. 3 that the test begins at time 0. Before time 0, the space pressure sensor 150 measures a varying background pressure indicative of normal room or space pressure variations over time. Similarly, prior to initiation of the test, the pressure in the compressor 130 as shown by curve 330 is constant. At time 0, a test is initiated by providing a pulse into the space to be tested using the system 100 as described above. The pulse is provided for 1.5 seconds, causing a corresponding drop in the measured pressure of the air within the compressor 130 from the pressure sensor 132 located either within the compressor or within the nozzle unit 140.

Release of a pulse (or volume) of pressurised air into space 102 causes a spike in the measured room pressure from the pressure sensor 150. This is evident in both tests. It can be noted that there is a small offset between the initiation of the pulse as shown by the drop in pressure from the compressor sensor 132 and the rise in pressure detected by the background space pressure sensor 150. This is caused by the pressure pulse propagating through the space 102 at a fixed speed (the speed of sound, 340 ms$^{-1}$).

After completion of injection of the pulse, the pressure in the compressor begins to increase back to a set pressure (the pressure before the initiation of the pulse). The pressures within the space 102 also typically decay back to similar levels to the background pressure measured prior to application of the pulse.

Using a linear calibration relationship between the voltage and pressure, the transient pressure difference across the building openings, $\Delta p$, and the transient pressure in the compressor receiver, a corresponding representation of the variation of the pressure within the space 102, P, can be obtained.

Figure 4:
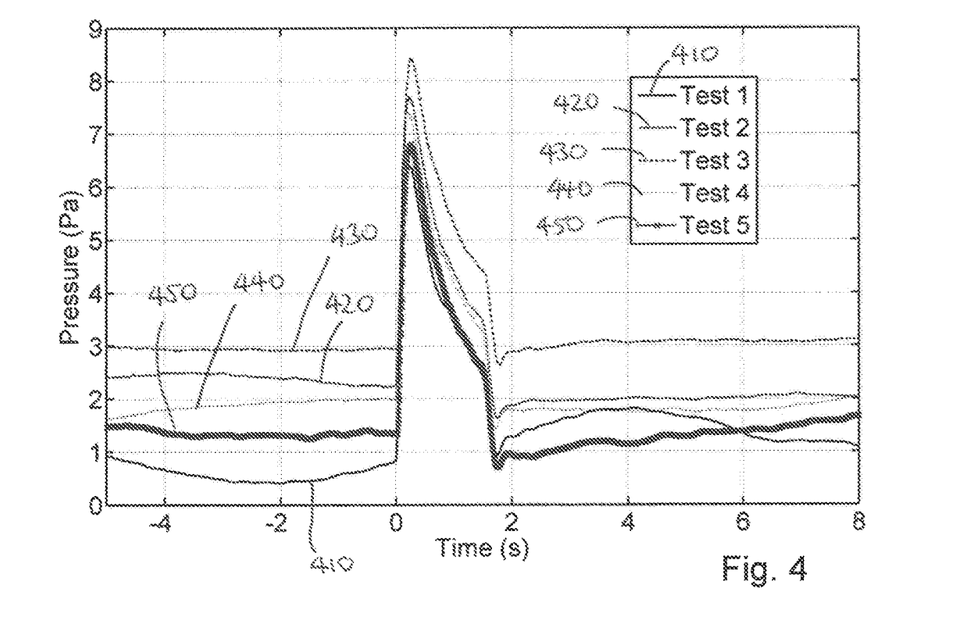
FIG. 4 is a set of graphical data recorded by the pressure sensors of FIG. 1.

FIG. 4 shows the raw data of pressure pulses obtained by five repeated test runs 410, 420, 430, 450 under the conditions used for FIG. 3. A pulse time of 1.5 s was used for these tests because it gave a long enough period of quasi-steady flow. The effect of the wind is apparent as a variation of $\Delta p(t)$ both before and after the provided pressure pulse. Theoretical calculations suggest that the measured pressure pulse can be approximated by adding the still air pressure pulse to the pressure difference due to the wind (buoyancy). The still air pulse can accordingly be obtained experimentally by subtracting the variation of the pressure due to wind and buoyancy (i.e. the background pressure of the space) from the measured pressure response. As may be noted from FIG. 4, the wind and buoyancy affecting the space 102 may vary considerably between test runs. However, after application of the pulse, the background pressure returns to a similar level to that observed before the pulse. Accordingly, it is possible to interpolate for the likely change in pressure during the duration of the pulse from the results of the change in pressure before the start of the pulse (between −1 and 0 seconds) and after the application of the pulse (between 2 and 3 seconds).

Figure 5:
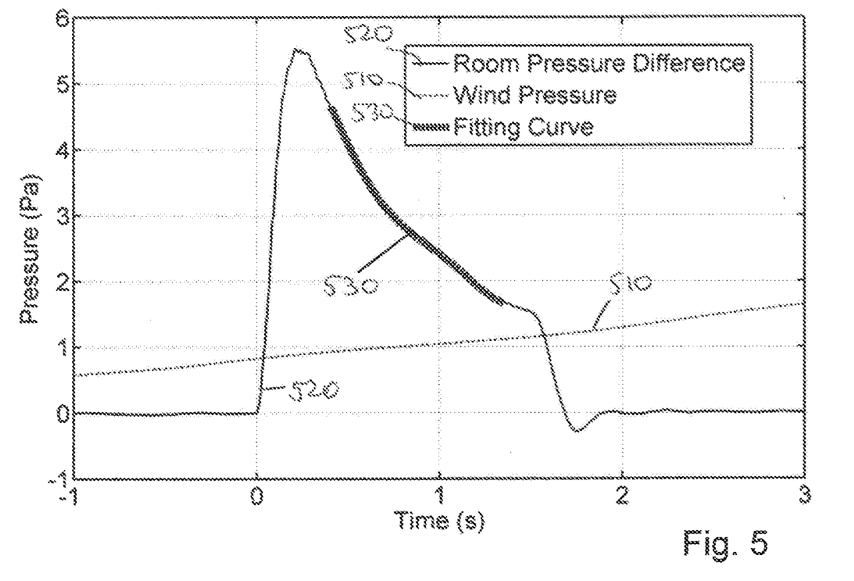
FIG. 5 is an adjusted graph of FIG. 4 accounting for wind pressure.

FIG. 5 provides an example of the process of adjustment of wind pressures for the pressure pulse test result 410 shown in FIG. 4. The thin dashed line, 510 shows the wind pressure obtained by interpolating from the measurements of the background pressure measured before and after application of the pulse. The solid line 520 shows the pressure after adjustment for this wind pressure (i.e. the still air pressure). Whilst the approximation of the variation of the background pressure during the pulse period provides an uncertainty, comparisons between tests indicate that this uncertainty is usually small. Outliers can usually be identified through comparison with repeated rounds.

Figure 6:
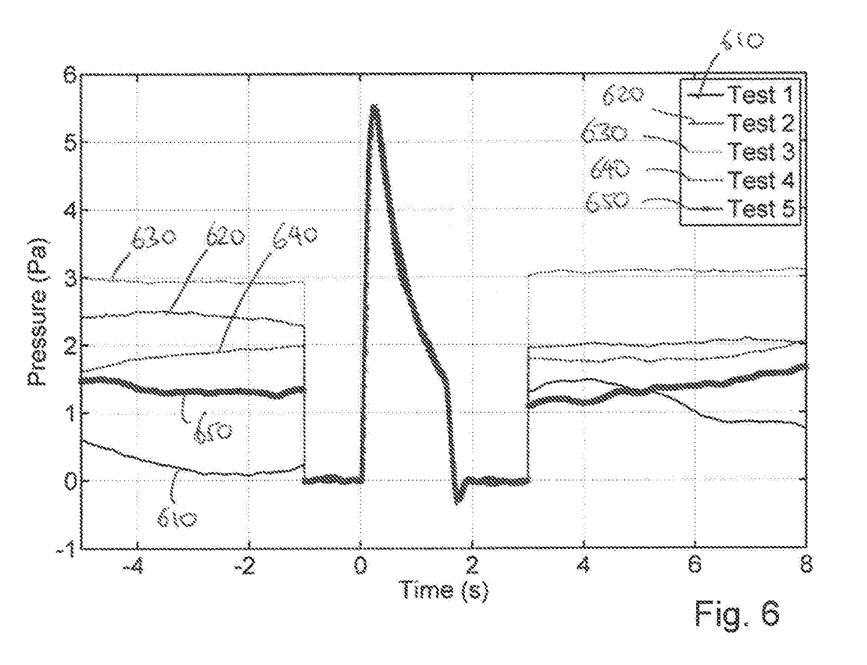
FIG. 6 is the set of graphical data of FIG. 4 adjusted to account for wind pressure.

FIG. 6 shows the results shown in FIG. 4, adjusted during the time period of −1 to 3 seconds to account for the background wind pressures. It can be seen, that all 5 test results provide a similar response of the space to the application of the pulse. In other words, the shape and characteristics of the application and decay of the pulse supplied into the space for testing the air leakage shows a consistent response across multiple separate tests. Indeed, individual pressure pulses collapse very closely onto a single curve, i.e. the still air curve.

Once the pressure differences across the space are adjusted as described in FIGS. 5 and 6, the building leakage can be calculated. For the calculation, the quasi-steady flow period of the pressure pulse is chosen. Flow during the latter part of the pressure pulse typically achieves such quasi steady conditions. For the example shown in FIGS. 5 and 6, a time range of 0.4 to 1.3 seconds was chosen as the period of quasi steady flow. As shown in FIG. 5, the fitting curve 530 is applied during this quasi steady time duration or range. By applying a polynomial curve fit of the still air pressure during this period of quasi steady flow, the rate of change of the pressure with respect to time can be determined. This equates to the second term of the right hand side of Eq. (2).

Figure 7:
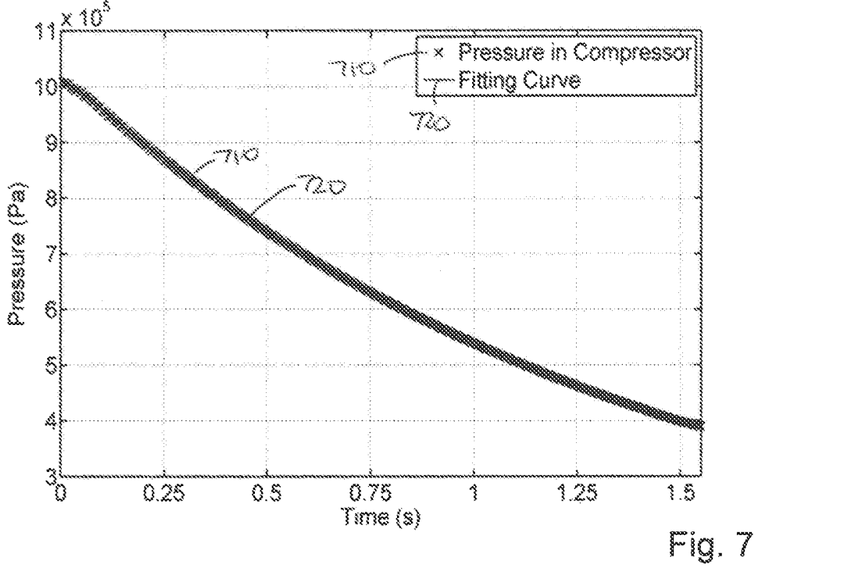
FIG. 7 is the transient pressure in the source of FIG. 1.

This necessary to determine the mass flow rate of the pressurised air metered by the nozzle unit 120 during application of a pulse as described above. Since the signal from the pressure sensor 132 vibrates slightly during the pulse (if a strain-based pressure transducer is used) a polynomial curve is applied. FIG. 7 shows the pressure 710 during the whole pulse period, together with a fitting curve 720. In practice, only the values in the period of the quasi steady flow period are required.

Figure 8:
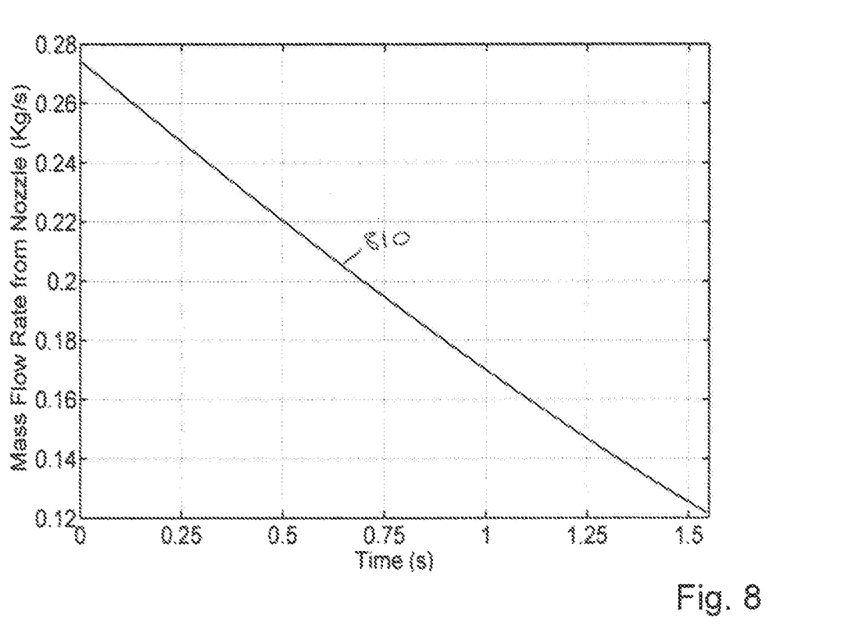
FIG. 8 is a mass flow rate determined from the transient pressure of FIG. 7.

From a comparison between the pressure of the compressor or nozzle unit and the pressure of the reference background pressure and density, the transient mass flow rate from the nozzle unit 120 can then be obtained from Eq. (6) if the volume of air injected is known. This is shown in FIG. 8 as curve 810. Using the obtained mass flow rate, the first term of the right hand side of Eq. (2) can then be calculated.

Figure 9:
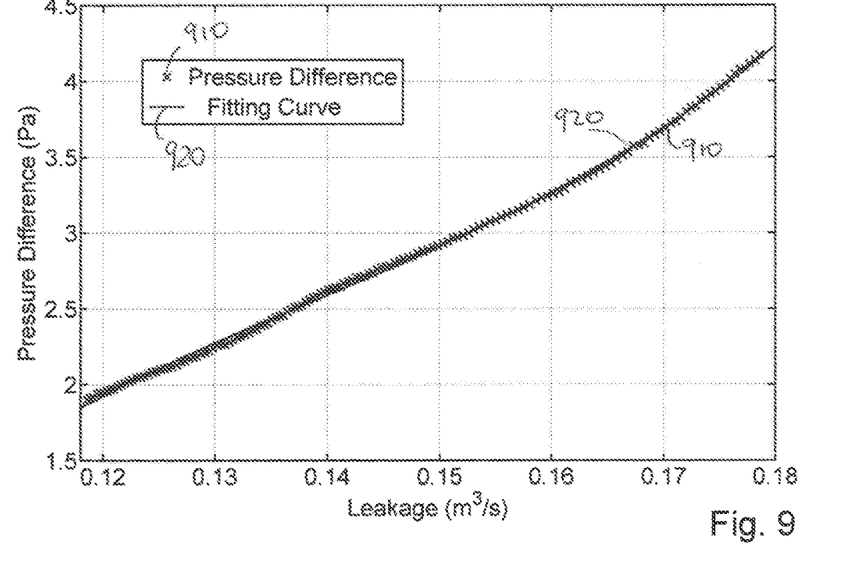
FIG. 9 is the leakage obtained by the system of FIG. 1 for a space.

Now that both the first and second terms at the right hand side of Eq. (2) have been obtained, the transient leakage of the building, q{t} can then be determined as shown in FIG. 9. FIG. 9 shows a variation 910 of q{t} with the still air pressure $\Delta p$ and the corresponding fitting curve 920. Leakage at 4 Pa, which is the required standard, can be obtained from the fitting curve. The example shown, $Q_4$=0.1753 $m^3 s^{-1}$. In addition, under this type of condition it was found that the variation of the still air pressure respect time could be fitted by a quadratic function. This allows estimation of the values of the inertia term during the chosen quasi steady period. This therefore also confirms whether the quasi steady flow condition was satisfied in this period. Effective shape and size of the building opening and correspondingly the values of the inertia term during the chosen period can then be obtained.

Similarly, the leakage q{t} for the 5 repeated test runs shown in FIG. 6. Provide leakage values at 4 Pa, $Q_4$ values for the 5 repeated test runs of 0.17535, 0.17557, 0.17704, 0.17525 and 0.17668 $M^3 s^{-1}$. An average $Q_4$=0.17598 $m^3 s^{-1}$. This provides a maximum difference of 1.01%, suggesting reproducibility and repeatability of this test. Further tests were done to assess the sensitivity of the technique by sealing and unsealing the openings around the test room door. The technique measured an average difference of 0.01626 $m^3 s^{-1}$, suggesting that the technique is sufficiently sensitive to small changes in leakage.

Figure 10:
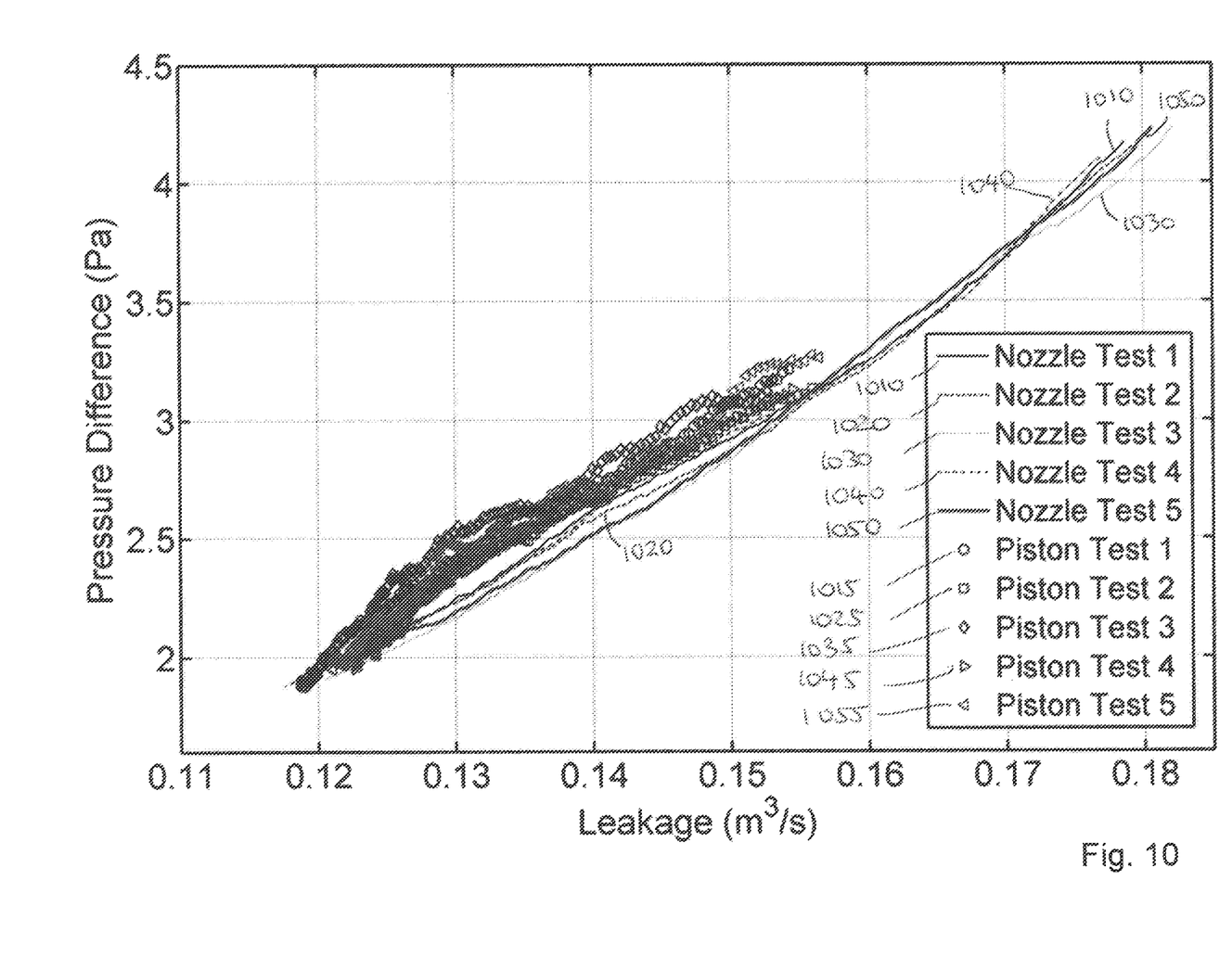
FIG. 10 is a comparison of leakage test results for the space of FIG. 9.

To test the robustness of the results, the 5 obtained nozzle test results 1010, 1020, 1030, 1040, 1050 were tested for the same space 102 in the same test room under the same conditions as a known piston test technique 1015, 1025, 1035, 1045, 1055 and a comparison is shown in FIG. 10. Good agreement appears and indicates that the nozzle technique is reliable for determining building leakage at low pressures. It can be seen that the piston tests always give slightly lower values of leakage under the same pressure differences. During the piston test, there is an unavoidable leak of air from the narrow gap between the piston and cylinder wall. Therefore, the piston test may underestimate the leakage slightly because it obtains the leakage indirectly from the velocity of the piston.

Figure 11:
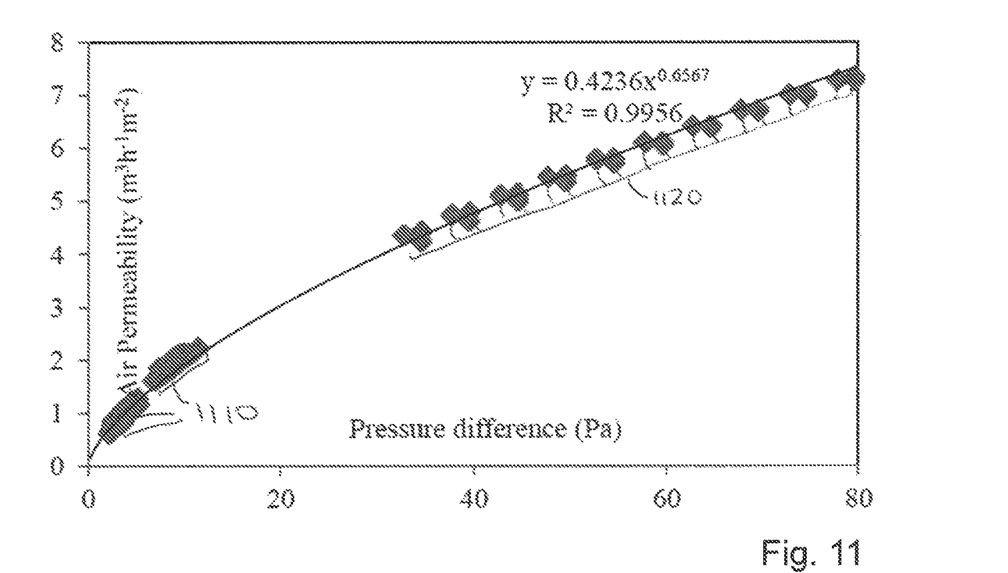
FIG. 11 is a further comparison of leakage test results for a space.

Another known technique, the Blower door technique, which has been a globally adopted method for measuring airtightness (International Organisation for Standardization (ISO) 9972: 2006, European Standards (EN) 13829:2000), has been used to test the same property along with the nozzle pulse technique of the present disclosure to see the correlation between the air leakage results given by these two techniques. A straightforward comparison between them is not possible, because the air leakage rate is obtained under a different pressure difference level. Accordingly, it is inappropriate to simply conclude the accuracy of one technique over the other. However, by plotting them together in a graph enables us to gain insight into the relation between them. As shown in FIG. 11, when both techniques are used to generate a permeability-pressure results, the results 1110 obtained by the present system and method at low pressure and results 1120 obtained using the blower door technique method allow the fitting of a power law equation $y=0.4236x^{0.6567}$. An accurate fit has been obtained because $R^2$ equals 0.9956, very close to 1. At this $R^2$ value gives a good indication that the low pressure pulse technique gives a good agreement with the blower door test results at high pressure (typically 50 Pa).

This is further shown in table 1 below that shows a comparison of the nozzle and blower door techniques' abilities to measure an added known opening:

TABLE 1

A Comparison between the blower door test and the present nozzle test disclosure. (A short sharp-edged circular opening with a geometric area of $7.854 \times 10^{-3}$ $m^2$ (Dia. 100 mm) was added into a test building. Using the Bernoulli Principle with a discharge coefficient of 0.61, the effective leakage area is therefore $4.791 \times 10^{-3}$ $m^2$.)

|  | Measured area of the opening, $m^2$ | Percentage difference from the actual known opening of $4.791 \times 10^{-3}$ $m^2$ |
|---|---|---|
| Blower door (@ 50 Pa) | $5.9264 \times 10^{-3}$ | 23.7% |
| Nozzle test (@ 4 Pa) | $5.0349 \times 10^{-3}$ | 5.1% |

In order to obtain the permeability at 4 Pa which is a more accurate indicator of building airtightness in reality, the power law airtightness characteristic obtained at high pressure by the conventional steady state technique needs to be extrapolated down to 4 Pa. Extrapolating the results at high pressures (typically 50 Pa) down to infiltration pressures (typically 4 Pa) is a known technique, but may incur significant uncertainty. Experimentally and theoretically the errors can be as high as +/−40%.

At low pressure the power law equation shows a significant difference from the leakage calculated using the present technique (which may take the form of a quadratic equation describing the flow characteristics of the space). The present technique also allows a representation of the flow characteristic of openings to be determined over a wide range of pressures. The power law can typically only give a good fit over a limited range of pressures. When compared to the power law, the present technique should be used in preference for modelling the behaviour of adventitious openings due to the fact that the present technique was derived for developing flows and it does not rely on any significant length of fully developed flow within the opening. Meanwhile, it is unlikely that turbulence within the opening is a significant factor in adventitious openings. From the present technique, it is possible to obtain the coefficients of a quadratic equation describing the momentum of the air through the leakage and thus determine from characteristics. This can be obtained from existing data and the equation is easier to use than compared to the power law.

Compared to the power law, the present technique relates to the unsteady behaviour of leakage openings and allows a consistent approach to be used for investigating the effects of changes to the geometry of an opening on both inertia and steady flow effects due to its reflection of the relationship between the equation and the geometry of the opening. Therefore, it can more closely represent the flow characteristics of adventitious opening.

From reading the present disclosure, other variations and modifications will be apparent to the skilled person. Such variations and modifications may involve equivalent and other features which are already known in the art of vapour blasting, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality and reference signs in the claims shall not be construed as limiting the scope of the claims.

The invention claimed is:

1. A system for determining the air leakage of a space in a building, said system comprising:
   a processor;
   a source of compressed air wherein the source is a pressure tank containing compressed air, where a minimum size of the pressure tank is selected such that a quasi-steady pulse can be generated;
   one or more space pressure sensors configured to provide transient pressure signals and background pressure signals of air residing within the space and, and to provide these signals to the processor;
   a temperature sensor configured to measure the temperature of air residing within the space, and to provide a space air temperature signal to the processor;
   a nozzle unit for metering the supply of a pulse of compressed air from the source and for directing the pulse into the space the nozzle unit configured to gradually reduce a constriction of flow of air from the source as it leaves the source such that it produces a reproducible pulse shape and delivers quasi-steady flow conditions; and
   a source pressure sensor configured to measure a transient source pressure during the pulse and to provide a transient source pressure signal to the processor;
      wherein the background pressure signals are pressure readings of internal pressure of air within the space before and after supply of the pulse; and the transient source pressure signals are pressure readings of internal pressure of air within the space during the quasi-steady flow conditions created by the pulse; and
      wherein the processor is configured to determine the air leakage based on: a volume of the space; changes in the background pressure signals; the transient space pressure signal, the space air temperature signal, the transient source pressure signal and the volume of the source.

2. The system according to claim 1, wherein the system further comprises a reference pressure source for providing a reference pressure reading.

3. The system according to claim 2, wherein the reference pressure source is an external space, separate from the building.

4. The system according to claim 2, wherein the reference pressure source is a reference pressure tank having a known volume and pressure of air.

5. The system according to claim 2, wherein the system further comprises a reference pressure sensor for recording a transient reference pressure signal of the reference pressure source.

6. The system according to claim 1, wherein the nozzle unit comprises an outlet for delivering the pulse into the space and a valve connection between the outlet and the pressure tank.

7. The system according to claim 6, wherein the outlet is a pneumatic silencer for controlling expansion of the pulse of compressed air into the space.

8. The system according to claim 6, wherein the valve connection is a solenoid valve.

9. The system according to claim 6, wherein the valve connection is an automated valve.

10. The system according to claim 6, wherein the outlet has a 1 inch diameter at its external edge.

11. The system according to claim 1, wherein the nozzle unit opens for a period of time required to provide a desired volume of the pulse.

12. The system according to claim 11, wherein the pulse metered by the nozzle unit has a volume more than 0.003% and less than 0.5% of the volume of the space.

13. The system according to claim 11, wherein the nozzle unit supplies a pulse of 1.5s duration starting at 10 bar pressure.

14. The system according to claim 1, wherein the nozzle unit is configured to gradually reduce the flow constriction of the pulse from the source to the space.

15. The system according to claim 14, wherein the source pressure sensor records a series of transient pressures to determine a mass flow of air out of the source during supply of the pulse.

16. The system according claim 1, wherein the system further comprises a compressor for providing and/or maintaining the source of compressed air.

17. The system according to claim 1, wherein the system further comprises a control unit for controlling the metering of the supply of the pulse from the source.

18. A control unit for determining the air leakage of a space in a building, said control unit comprising one or more systems according to claim 1 and configured to control the metering of the supply of the pulse from the source.

19. A control unit according to claim 18, wherein the control unit integrates one or more components of the system within the control unit.

20. A method of determining the air leakage of a space, said method comprising the steps of:
   measuring a background pressure of air residing within the space, indicative of background pressure variations within the space;
   measuring a temperature of air residing within the space;
   displacing a volume of compressed air from a source into the space using a nozzle unit to direct a pulse of pressurized air, the nozzle unit configured to gradually reduce the constriction of flow of air from the source as it leaves the source such that it produces a reproducible pulse shape and delivers quasi-steady flow, wherein the source is a pressure tank containing compressed air, selected with a minimum size such that the pulse shape and quasi-steady flow can be produced;

measuring transient pressure of air within the space during quasi-steady flow conditions created by the pulse;

determining an injection pressure of the pulse as it is directed into the space;

measuring an altered background pressure of air residing within the space after dissipation of the pulse;

determining a background pressure variation based on the background pressure and the altered background pressure; and determining a leakage profile of the air filled space using the injection pressure, the volume of the source, the initial air temperature within the space, the transient pressure of air within the space, the background pressure variations and the internal volume of the space.

21. The method of claim 20, wherein the step of determining an injection pressure further comprises the step of: obtaining the change in internal pressure of the space during at least a portion of the pulse.

22. The method of claim 20, wherein the step of determining a background pressure variation further comprises the step of: interpolating a transient background pressure of air during the pulse of pressurized air from the background pressure of air and the altered background pressure of air.

23. The method of claim 22, wherein the step of determining a leakage profile further comprises the step of adjusting for the transient background pressure.

24. The method of claim 20, further comprising the step of extrapolating the leakage profile to determine the likely leakage of air leakage from the space at elevated air pressures.

* * * * *